July 13, 1926.

H. LEE

TRANSMISSION MECHANISM

Filed March 21, 1921

1,592,666

INVENTOR.
Hoard Lee.
BY
ATTORNEY.

Patented July 13, 1926.

1,592,666

UNITED STATES PATENT OFFICE.

HOARD LEE, OF SHREVEPORT, LOUISIANA.

TRANSMISSION MECHANISM.

Application filed March 21, 1921. Serial No. 454,050.

This invention relates to new and useful improvements in a transmission mechanism.

One object of the invention is to provide a tranmission mechanism whereby the driving shaft may be operatively connected with the driven shaft so as to impart variable rates of speed from the former to the latter.

Another object is to provide a transmission mechanism wherein the gears, through which the rotation is imparted from the driving to the driven shaft will always be in mesh, thus preventing the clashing of gears and injury to the same in changing speed.

A further feature of the invention resides in the provision of a transmission mechanism which is of simple construction and consequently may be cheaply and easily manufactured and which will be easily operated.

With the above and other objects in view the invention has particular relation to certain novel features of construction, operation and arrangement of parts, an example of which is given in this specification and illustrated in the accompanying drawings, wherein:—

Figure 1:
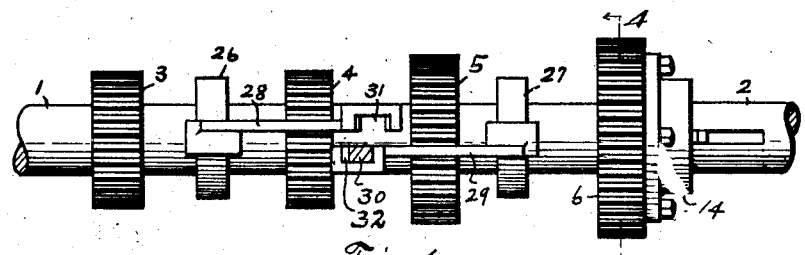
Figure 1 is a plan view of the device.
Figure 4:
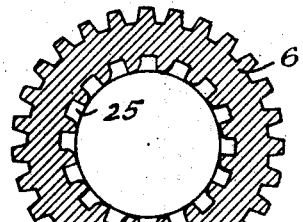
Figure 4 is a vertical sectional view of the type of gear employed taken on line 4—4 of Figure 1.
Figure 3:
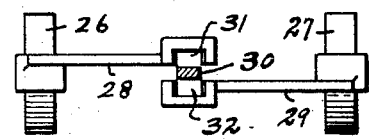
Figure 3 is a plan view of the shift yokes employed.
Figure 2:
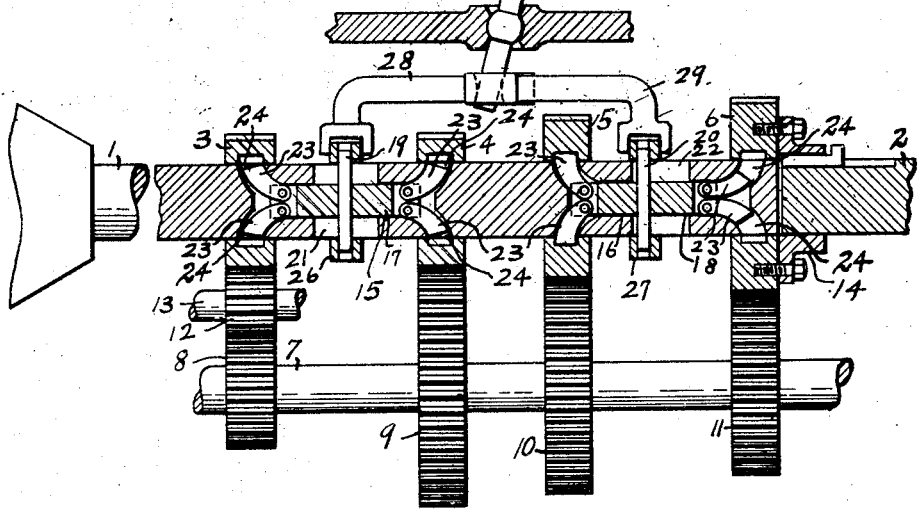
Figure 2 is a side view, partially in section.

Referring now more particularly to the drawings, the numeral 1 indicates the driving shaft which is operatively connected with and driven by the motor and the numeral 2 designates the driven shaft which is aligned with the driving shaft. Rotatably mounted on the driving shaft are the transmission spur gears 3, 4, 5 and 6, for reverse, low, second and high speeds, respectively. The numeral 7 designates a secondary shaft fixed upon which are the spur gears 8, 9, 10 and 11, respectively. Interposed between the gears 3 and 8 and in mesh with both there is an intermediate gear wheel 12 mounted upon a suitable shaft 13. The gears 4, 5 and 6 are in mesh, respectively, with the gears 9, 10 and 11, and the high speed gear 6 is fixed to the adjacent end of the driven shaft 2 by means of a suitable flange 14 which is splined upon the shaft 2 and bolted to said gear 6. The driving shaft 1 has a central bore 15 between the gears 3 and 4 and a similar central bore 16 between the gears 5 and 6, and slidable in said bores are the respective plungers 17 and 18. The movement of these plungers in either direction is limited by the respective keys 19 and 20, which are fitted through them and work in the keyways 21 and 22 cut through said shaft. Pivoted to the ends of the respective plungers are the arcuate dogs 23 which work in correspondingly shaped guides 24 which diverge out through the shaft 1 from the respective ends of the bores 15 and 16. The gears 3, 4, 5 and 6 are provided with the internal notches 25, into which the outer ends of the dogs are adapted to engage. A plurality of these notches are provided so that when the dogs are actuated some of the notches will be in position to receive the dogs, and the approaching side of each notch is beveled, as shown in Figure 4, to readily receive the dogs. The outer ends of the respective keys 19 and 20 are anchored in the rings 26 and 27, which surround and are slidable upon the shaft 1. A pair of shift yokes 28 and 29 are employed, whose outer ends are downwardly turned and bifurcated, the fingers thereof embracing the respective rings 26 and 27. The numeral 30 designates the shift lever which has a universal bearing in the transmission case and whose lower end is extended and works between said yokes, as illustrated in Figure 3. The adjacent ends of said yokes overlap and are formed with the respective bearings 31 and 32, into which the lower end of the shift lever 30 may be engaged to shift either of said yokes. As shown in Figure 2, the second speed gear wheel 5 is clutched with the shaft 1. This is accomplished by manipulating the lever 30 into the bearing 32 of the yoke 29 and then shifting said yoke to operate the plunger 18 and carrying the dogs 23 into the opposing notches 25 of the gear wheel 5. Power will then be transmitted from the gear wheel 5 to the transmission gear wheel 10 and thence through the shaft 7 and the gear wheel 11 to high gear 6 and to the driven shaft 2. When the yoke 29 is manipulated in the opposite direction the dogs 23 at the other end of the plunger 18 will be shifted into engagement with the high gear 6 and a direct drive will be transmitted from the driving shaft to the driven shaft. By manipulating the shift lever into engagement with the yoke 28 the reverse gear 3 and the low gear 4 may be similarly clutched with the shaft 1 and power delivered to the secondary shaft 7 to the driven shaft 2 either in reverse or low speed ahead.

It is also obvious that the shift lever may be brought into neutral position in the usual way, as illustrated in Figure 3, when the drive shaft will run idle.

What I claim is:—

In a clutch mechanism, a drive shaft provided with a lengthwise bore and communicating arcuate guideways, a driven shaft, a gear mounted on said driven shaft, a clutch device located within the lengthwise bore of the driving shaft, dogs pivoted to the clutch device, and adapted to work through said arcuate guideways for engagement with and disengagement from said gear and a yoke for operating said clutch device.

In testimony whereof I have signed my name to this specification.

HOARD LEE.